(12) United States Patent
Nishimoto

(10) Patent No.: US 6,801,478 B1
(45) Date of Patent: Oct. 5, 2004

(54) MAGNETO-OPTICAL INFORMATION REPRODUCING APPARATUS

(75) Inventor: Hideki Nishimoto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 915 days.

(21) Appl. No.: 09/676,446

(22) Filed: Sep. 29, 2000

(30) Foreign Application Priority Data

Dec. 20, 1999 (JP) ............................................ 11-361056

(51) Int. Cl.[7] .............................................. G11B 11/00
(52) U.S. Cl. .................................. 369/13.14; 369/13.05
(58) Field of Search .......................... 369/13.14, 13.05, 369/13.02, 13.16, 13.15, 13.22, 13.25, 13.26, 13.27, 13.55; 428/694 ML, 694 MM

(56) References Cited

U.S. PATENT DOCUMENTS

| | | | | | |
|---|---|---|---|---|---|
| 5,831,942 A | * | 11/1998 | Morimoto et al. | ....... | 369/13.55 |
| 5,850,383 A | * | 12/1998 | Kawano | .................. | 369/275.4 |
| 5,870,353 A | * | 2/1999 | Morimoto et al. | ....... | 369/13.55 |
| 5,898,661 A | * | 4/1999 | Morimoto | .............. | 369/110.03 |
| 6,091,693 A | * | 7/2000 | Morimoto | .............. | 369/109.02 |
| 6,115,330 A | * | 9/2000 | Morimoto | ................ | 369/13.28 |
| 6,625,090 B1 | * | 9/2003 | Takeuchi et al. | ......... | 369/13.42 |

FOREIGN PATENT DOCUMENTS

| | | |
|---|---|---|
| JP | 9320138 | 12/1997 |
| JP | 1083536 | 3/1998 |
| JP | 10255349 | 9/1998 |
| JP | 1173700 | 3/1999 |
| JP | 2001-176143 A | * 6/2001 |

* cited by examiner

Primary Examiner—Tan Dinh
(74) Attorney, Agent, or Firm—Greer, Burns & Crain, Ltd.

(57) ABSTRACT

There is disclosed a magneto-optical information reproducing apparatus which can perform information reproducing with a low crosstalk level, and the apparatus comprises a biasing electromagnet 19 for generating a reproducing magnetic field, and an MPU 26 for adjusting an intensity of the magnetic field generated by the biasing electromagnet 19 with respect to a land and a groove so that with respect to one of the land and the groove in which reproducing object information is recorded, a level of a crosstalk attributed to the information recorded in the other one of the land and the groove is lowered.

10 Claims, 11 Drawing Sheets

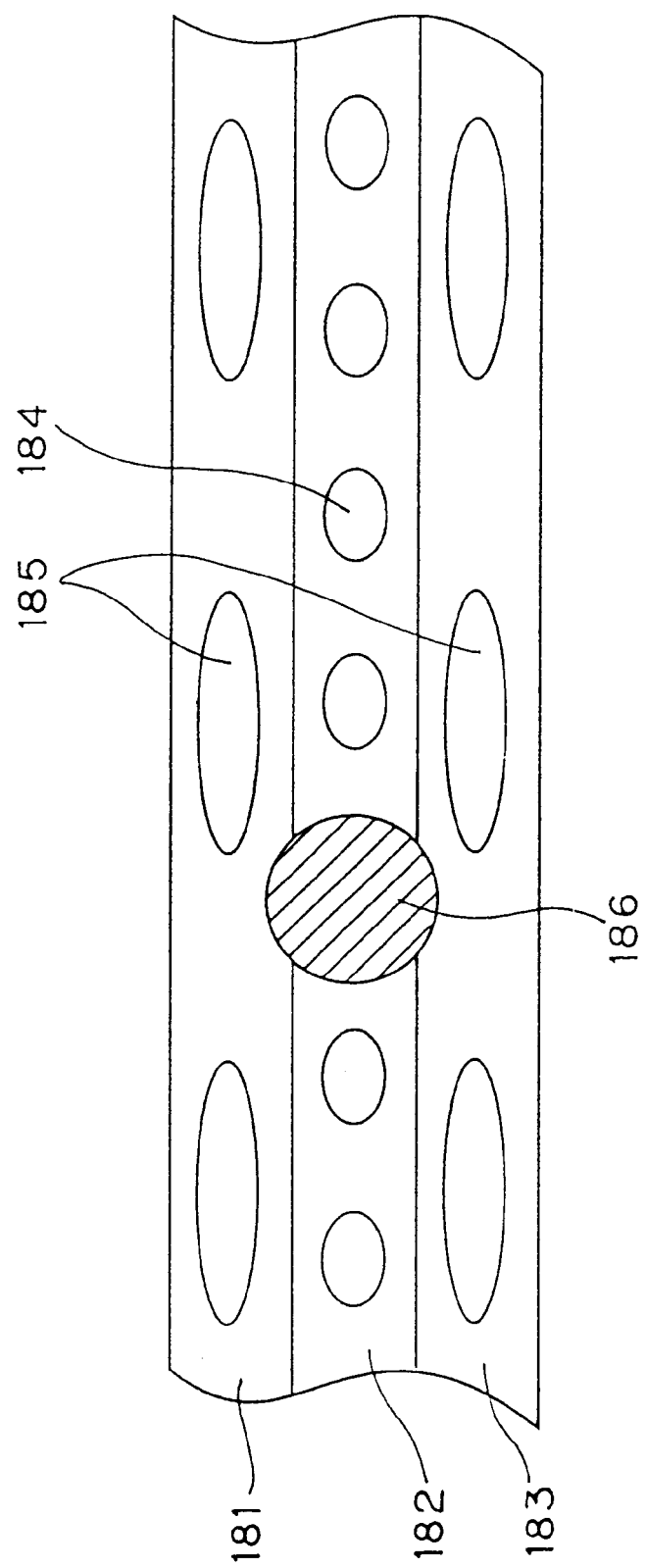

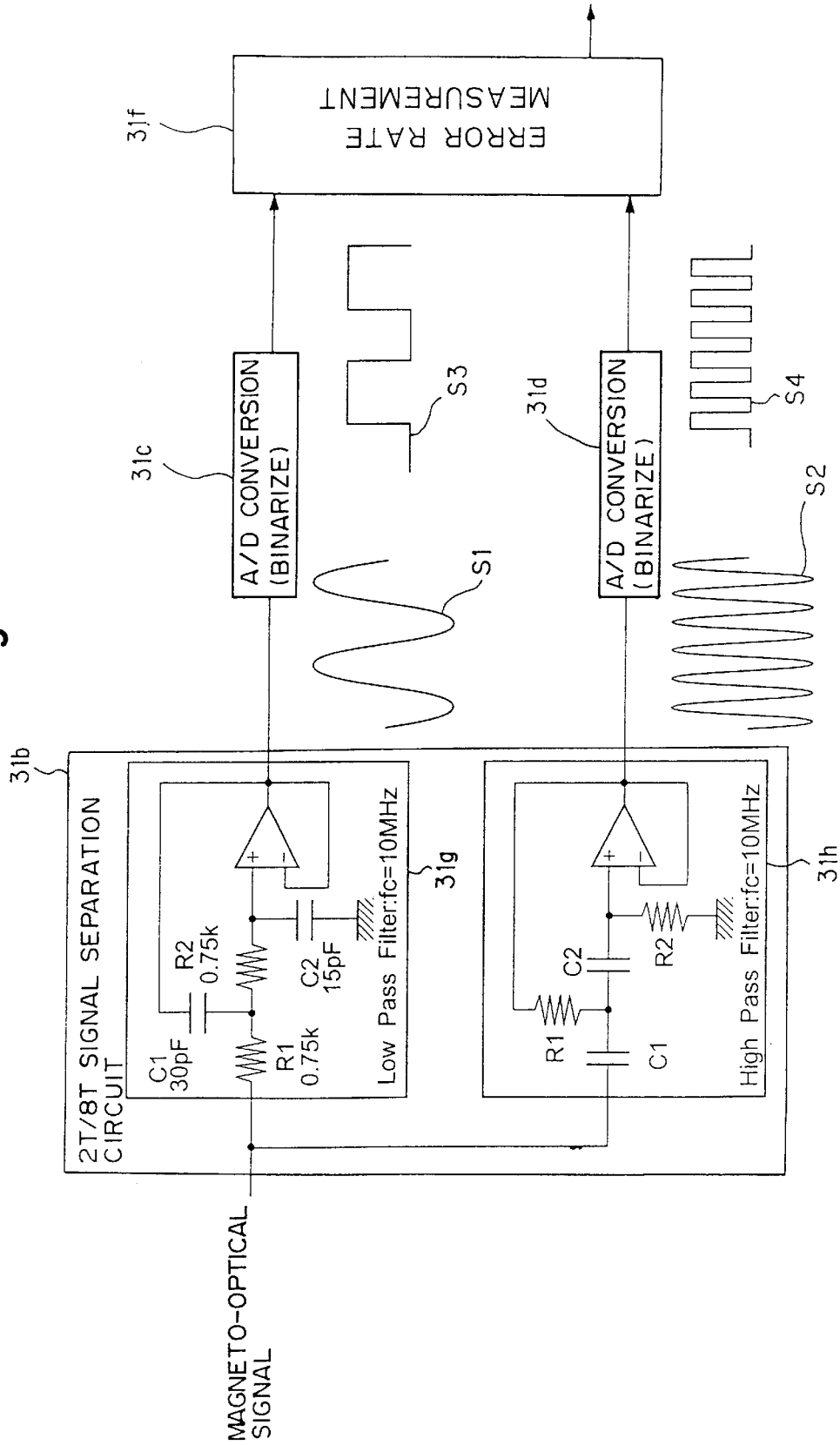

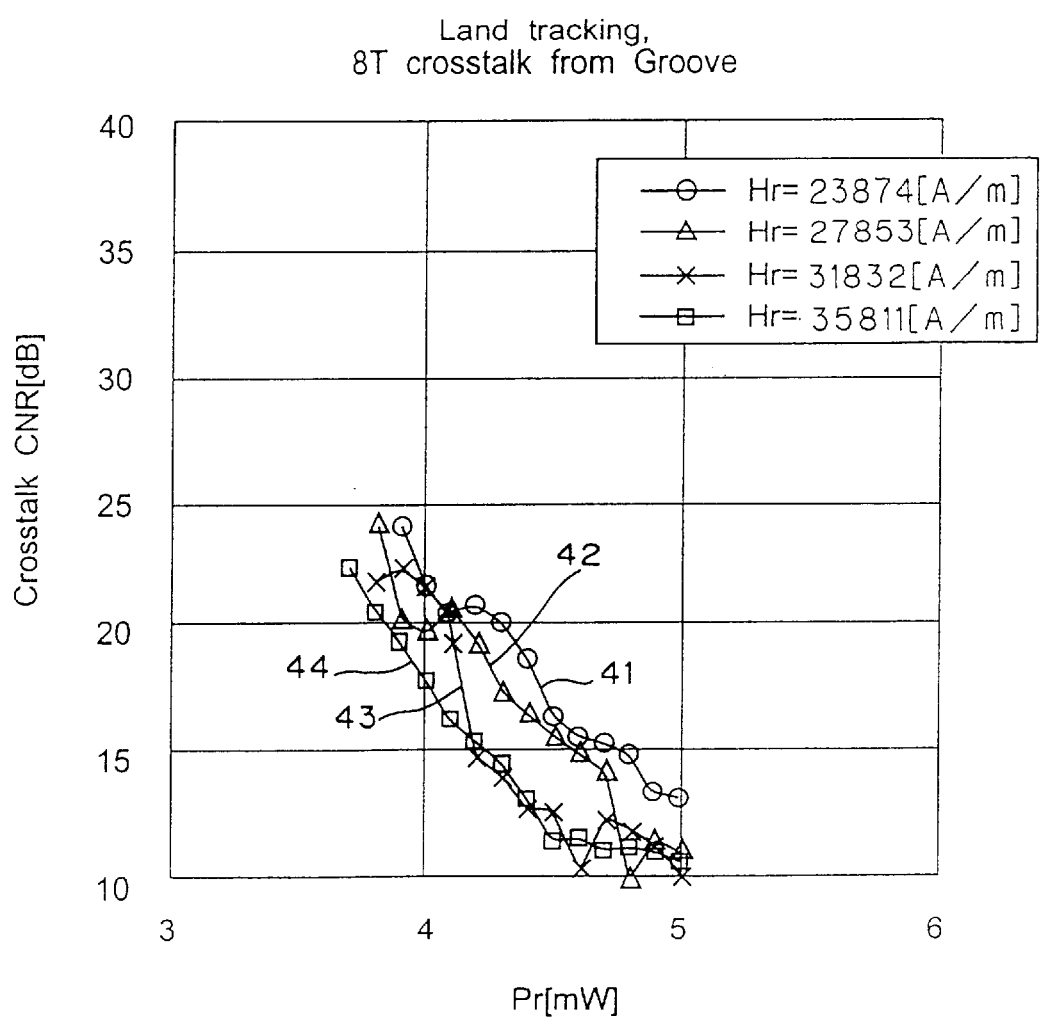

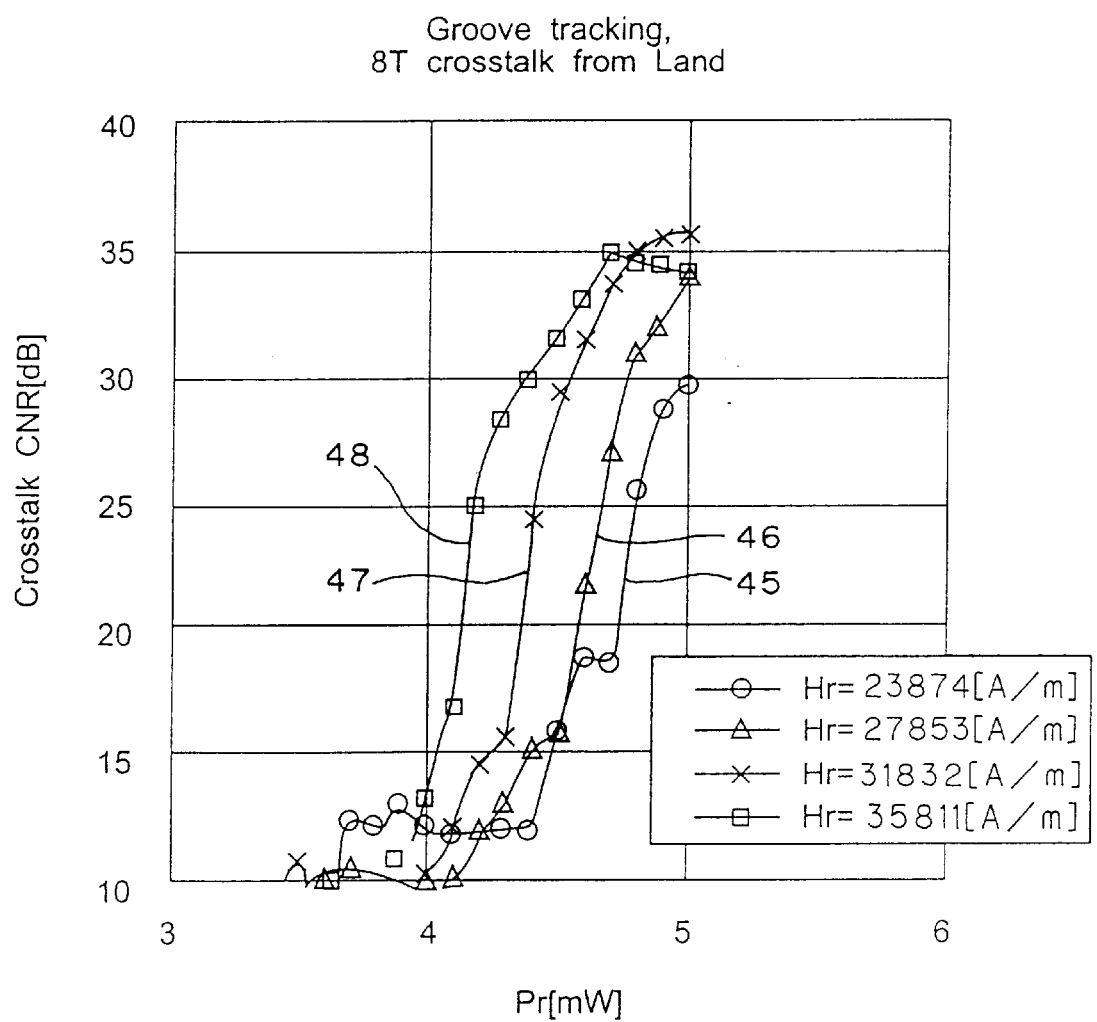

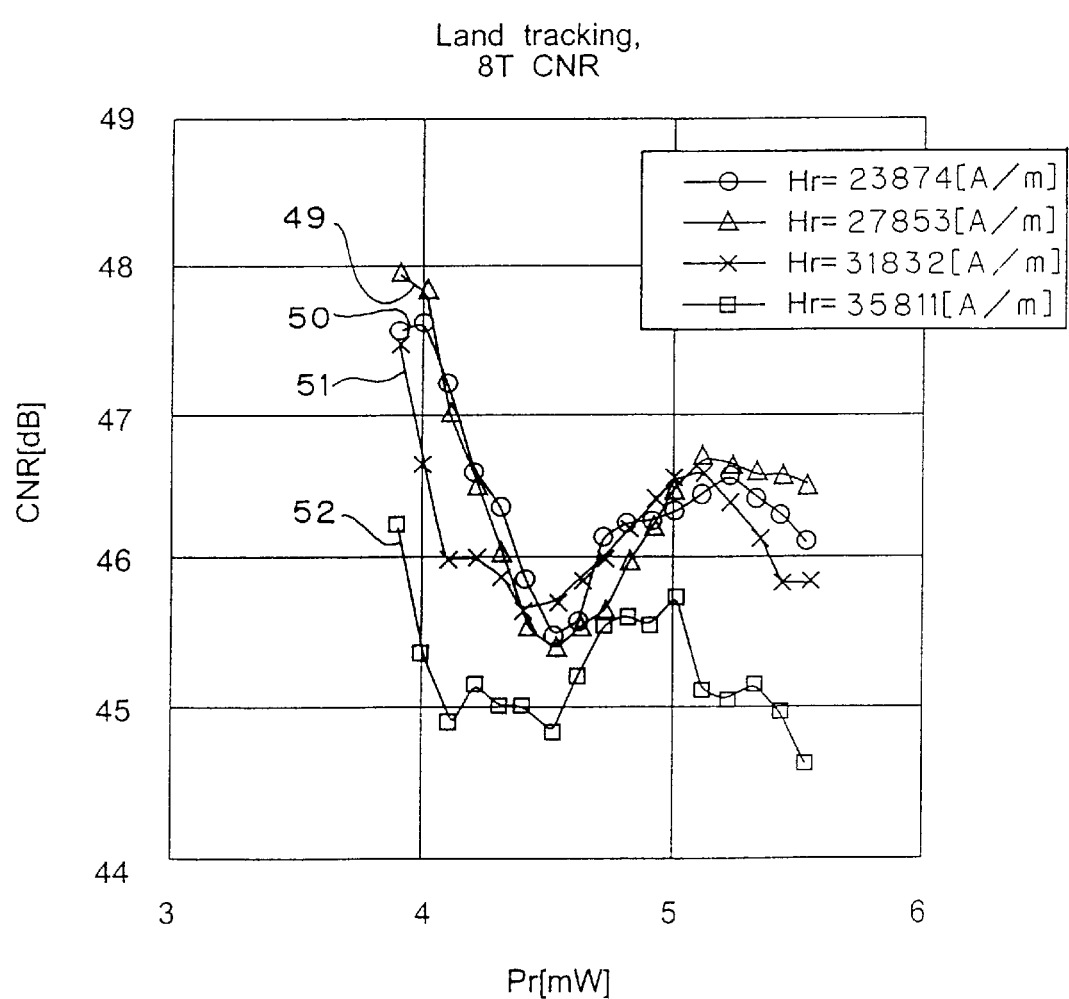

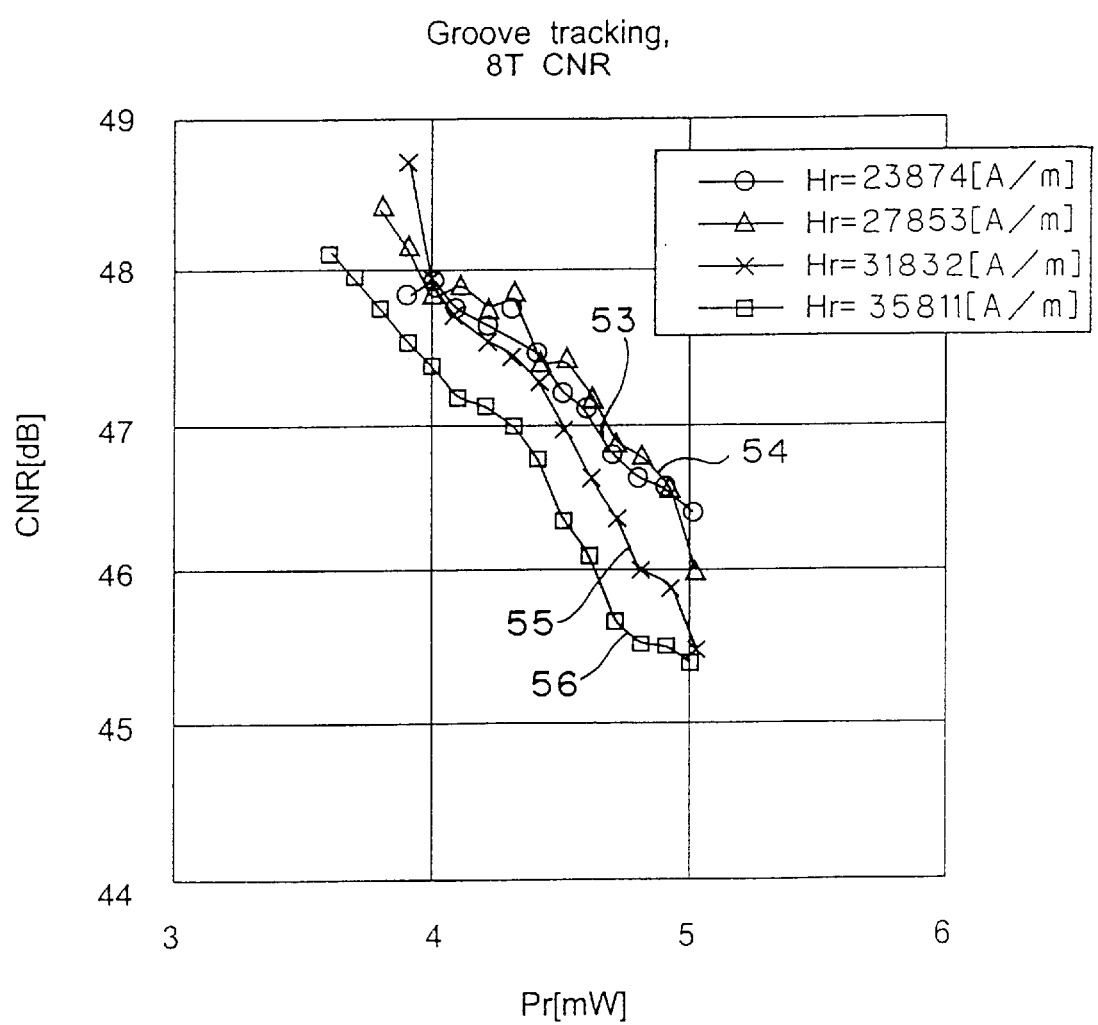

MAGNETO-OPTICAL INFORMATION REPRODUCING APPARATUS

BACKGROUND OF THE INVENTION i) Field of the Invention

The present invention relates to a magneto-optical information reproducing apparatus for reproducing information recorded in a recording medium in which a groove and a land are alternately formed and the information is recorded both in the groove and land by applying a magnetic field to the recording medium and irradiating the recording medium with light.

ii) Description of Related Art

An optical recording medium has heretofore been used broadly as a recording medium by which a sound signal and an image signal can be recorded/reproduced. Particularly, a magneto-optical recording medium has been noted as a high-density recording medium which can rewrite information, and intensively researched/developed. Moreover, a magneto-optical information reproducing apparatus for reproducing the information recorded in the magneto-optical recording medium has also been intensively researched/developed.

The magneto-optical recording medium generally has a disk form, and is provided with a spiral or concentric track, and the information is recorded in the track. Moreover, in order to enhance a recording density of the magneto-optical recording medium, two techniques of shortening a track pitch and of enhancing a linear recording density are considered. Either technique can be realized by shortening a wavelength of a semiconductor laser for use in recording/reproducing, but it takes some more time to realize a semiconductor laser in an inexpensive manner which continuously oscillates a short wavelength of green or blue at a room temperature steadily for a long time.

In this situation, a technique is sought which uses a semiconductor laser with the current wavelength to largely improve the linear recording density, such as a magnetic super resolution (hereinafter referred to as MSR) for applying a reproducing magnetic field to the magneto-optical recording medium to limit a reproducing object to an area smaller than a laser spot.

Moreover, as the technique of shortening the track pitch, a technique of land and groove recording has been proposed in which the information is recorded both in a furrow-like groove and a ridge-like land alternately disposed on the recording medium. In this land and groove recording, both the groove and the land are used as the track. Therefore, in the land and groove recording, as compared with a technique of using only one of the groove and the land as the track, the track pitch simply becomes ½. When the linear recording density is the same, the recording density can be doubled. Therefore, this technique is considerably important in realizing a high-density recording.

Additionally, in the land recording in which the information is recorded only in the land, the groove exists between adjacent lands, there is a gap between the lands in which the information is recorded, and occurrence of a crosstalk in which the information recorded in the adjacent land is mixed into reproducing information is therefore inhibited.

FIG. 1 is a diagram showing that the information recorded by the land recording is read.

Here, a groove 2 narrower than a land 1 is formed between the lands 1, and a recording mark 3 in accordance with the information is formed only on the land 1. Specifically, only the land 1 is used as the track, and a track pitch is, for example, about 0.9 μm. Moreover, the information is recorded by a mark space row constituted of the recording marks 3 and spaces 3' between the marks.

Moreover, FIG. 1 shows that the recording marks 3 are read by the aforementioned MSR. In the recording medium for the MSR system, the recording mark 3 and space 3' are in magnetization states different in magnetization direction from each other, the magnetization state of the recording mark 3 is hereinafter referred to as a recording state, and the magnetization state of the space 3' is hereinafter referred to as a clear state. Moreover, the information is read by recognizing these magnetization states, but for the sake of convenience of description, the recognition of the magnetization state is sometimes referred to as "reading of the recording mark".

During the reading of the recording mark 3, a laser spot 4 is tracked on the land (track) 1, and relatively moved in a direction of an arrow F with respect to the land 1 so that the recording mark 3 is read. In this case, a reproducing magnetic field is applied to an area held between a dotted line L1 and a dotted line L2. When the reproducing magnetic field and heat by the laser spot 4 both act on a material constituting the magneto-optical recording medium, a front mask 4a and rear mask 4b are formed to hide the presence of the recording mark 3. As a result, a range 4c in which the recording mark 3 can be read is limited to a range smaller than an irradiation range of the laser spot 4, and even the recording marks 3 recorded within a laser spot diameter can be read one by one. Moreover, by recognizing the recording mark 3 and space 3' constituting the mark space row, the information is reproduced.

As described above, since the groove 2 is formed between the lands 1, the recording mark 3 on a land 1b adjacent to a land 1a in which the laser spot 4 is tracked fails to enter the range 4c in which the recording mark can be read, and occurrence of the crosstalk is inhibited.

Similarly, in groove recording in which the information is recorded only in the groove, the land exists between adjacent grooves, there is a gap between the grooves in which the information is recorded, and occurrence of the crosstalk in which the information recorded in the adjacent groove is mixed into the reproducing information is inhibited. On the other hand, in the land and groove recording in which the information is recorded both in the land and the groove, no gap exists between the tracks, the occurrence of the crosstalk from the groove adjacent to the land or from the land adjacent to the groove cannot be avoided, and a large influence is therefore exerted to information reproducing ability.

FIG. 2 is a diagram showing that the information recorded by the land and groove recording is read.

Here, the land 1 and groove 2 with the same width are alternately formed, and the mark space row constituted of the recording marks 3 and spaces 3' in accordance with the information is formed both on the land 1 and groove 2. Specifically, both the land 1 and the groove 2 are used as the tracks, and the track pitch is a narrow pitch, for example, of about 0.6 μm.

FIG. 2 also shows that the recording mark 3 is read by the aforementioned MSR, and here shows, as one example, that the recording mark 3 on the land 1 is read. By irradiating the land 1 as a reading object track with the laser spot 4, relatively moving the laser spot 4 in the direction of the arrow F, and applying the reproducing magnetic field to the area held between the dotted lines L1 and L2, the front mask 4a and rear mask 4b are formed.

As described above, since the recording mark 3 is written both in the land 1 and groove 2, the recording mark readable range 4c also reaches the recording mark 3 on the groove 2 adjacent to the land 1 in which the laser spot 4 is tracked, and the crosstalk occurs.

For example, in Japanese Patent Application Laid-Open No. 7357/1996, a technique of appropriately selecting a groove depth and reducing the crosstalk from the land or the groove is proposed. However, in the groove with the selected depth, a carrier level corresponding to original reproducing information is lowered, and there is also a problem that a push/pull signal level for use as a tracking error signal is similarly lowered. Moreover, it has been already reported that the crosstalk reduction effect obtained by selecting the groove depth is easily collapsed by fluctuation of Kerr ellipticity, and focus error, spherical surface aberration, and the like of an objective lens.

Moreover, in Japanese Patent Application Laid-Open No. 153221/1997, a technique of reversing polarities of signals recorded in the land and groove to reduce the crosstalk is proposed. However, when the signal polarities of the land and groove are reversed in magneto-optical recording, noise is generated in a boundary of the land and groove, which raises a problem more than the crosstalk.

SUMMARY OF THE INVENTION

In consideration of the aforementioned situation, an object of the present invention is to provide a magneto-optical information reproducing apparatus in which information reproducing can be performed at a low crosstalk level.

To achieve the aforementioned object, according to the present invention, there is provided a magneto-optical information reproducing apparatus for reproducing information recorded in a recording medium in which a groove and a land are alternately formed and the information is recorded both in the groove and land, and for reproducing the information by applying a magnetic field to the recording medium and irradiating the recording medium with a light, the magneto-optical information reproducing apparatus comprising: a magnetic field generating section for generating the magnetic field to be applied to the recording medium; and an adjusting section for adjusting an intensity of the magnetic field generated by the magnetic field generating section with respect to the land and groove so that with respect to one of the land and the groove in which reproducing object information is recorded, a level of a crosstalk attributed to the information recorded in the other one of the land and the groove is lowered.

Here, the "crosstalk level" may be a level obtained by noticing only one of the crosstalks attributed to the land and groove, or a level obtained by generalizing the crosstalks attributed to the land and groove.

According to the magneto-optical information reproducing apparatus of the present invention, since the intensity of the magnetic field applied to the recording medium during information reproducing is adjusted so that the crosstalk level is lowered with respect to the land and groove, the information reproducing in a low crosstalk level is possible.

In the magneto-optical information reproducing apparatus of the present invention, the adjusting section preferably adjusts the intensity of the magnetic field in accordance with the intensity of the light radiated to the recording medium so that the crosstalk level is lowered.

The crosstalk level to the magnetic field intensity differs in accordance with the intensity of the light radiated to the recording medium during reproducing. Moreover, the light intensity is adjusted in accordance with environment temperature during reproducing. Therefore, by adjusting the magnetic field intensity in accordance with the intensity of the radiated light, the information reproducing in the low crosstalk level is assured.

Moreover, preferably the magneto-optical information reproducing apparatus of the present invention "further comprises a relation data preparing section for reproducing predetermined information with a plurality of magnetic field intensities and a plurality of irradiation light quantities and measuring a crosstalk level to prepare relation data indicating a relation among the magnetic field intensity, irradiation light quantity and crosstalk level based on a measurement result, and the adjusting section adjusts the intensity of the magnetic field based on the relation data prepared by the relation data preparing section."

Generally, the relation among the magnetic field intensity, irradiation light quantity, and crosstalk level depends on a material type of the recording medium. For the recording medium on the market, however, even when the information reproducing is possible by the same magneto-optical information reproducing apparatus, various constituting materials are used in accordance with makers and product types, and it is impossible to store the relation among the magnetic field intensity, irradiation light quantity and crosstalk level beforehand with respect to all disk material types.

According to the magneto-optical information reproducing apparatus provided with the relation data preparing section, the relation data indicating the relation among the magnetic field intensity, irradiation light quantity and crosstalk level is prepared based on measurement, and the magnetic field intensity is adjusted based on the relation data. Therefore, even when individual recording medium materials are unknown, the crosstalk can be depressed to a low level.

Furthermore, in the magneto-optical information reproducing apparatus of the present invention, the relation data preparing section preferably records a period signal for the land and a period signal for the groove different in frequency from each other in the land and groove of the recording medium, regenerates the recorded period signals with the plurality of magnetic field intensities and the plurality of irradiation light quantities and measures the crosstalk level to prepare the relation data based on a measurement result.

According to the preferably constituted magneto-optical information reproducing apparatus, since the period signal for the land and period signal for the groove different in frequency from each other are recorded in the recording medium, and these period signals are used as signals for crosstalk measurement, it is easy to separate original signal components from crosstalk components, and the crosstalk measurement is facilitated.

BRIEF DESCRIPTION OF THE DRAWINGS

FIG. 7 is a diagram showing recording marks by period signals of 2T and 8T patterns recorded in a land and groove.

FIG. 8 is an explanatory view of reproducing signal detection and crosstalk level measurement in a magneto-optical signal detection circuit 31.

FIG. 9 is a graph showing one example of a crosstalk measurement result during land tracking.

FIG. 10 is a graph showing one example of the crosstalk measurement result during groove tracking.

FIG. 11 is-a graph showing one example of a detection result of a reproducing signal during the land tracking.

FIG. 12 is a graph showing one example of a detection result of the reproducing signal during the groove tracking.

DETAILED DESCRIPTION OF THE PREFERRED EMBODIMENTS

An embodiment of the present invention will be described hereinafter. In the following, a magneto-optical information reproducing apparatus employing an MSR system as an example will be described, and the magneto-optical information reproducing apparatus of the present invention is not limited to the employment of the MSR system as long as a system of using a reproducing magnetic field is employed.

Figure 1:
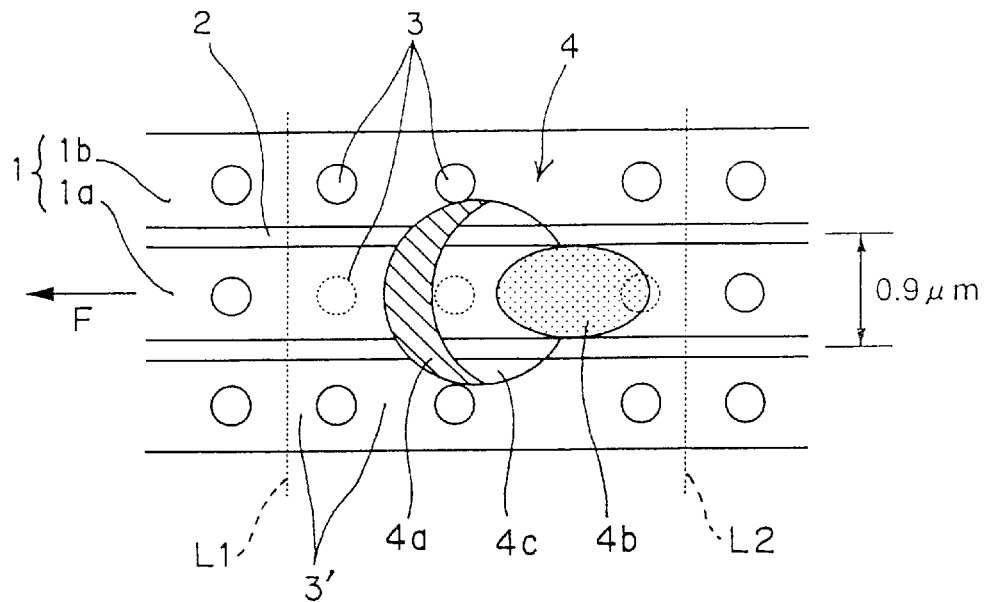
FIG. 1 is a diagram showing that information recorded by land recording is read.
Figure 2:
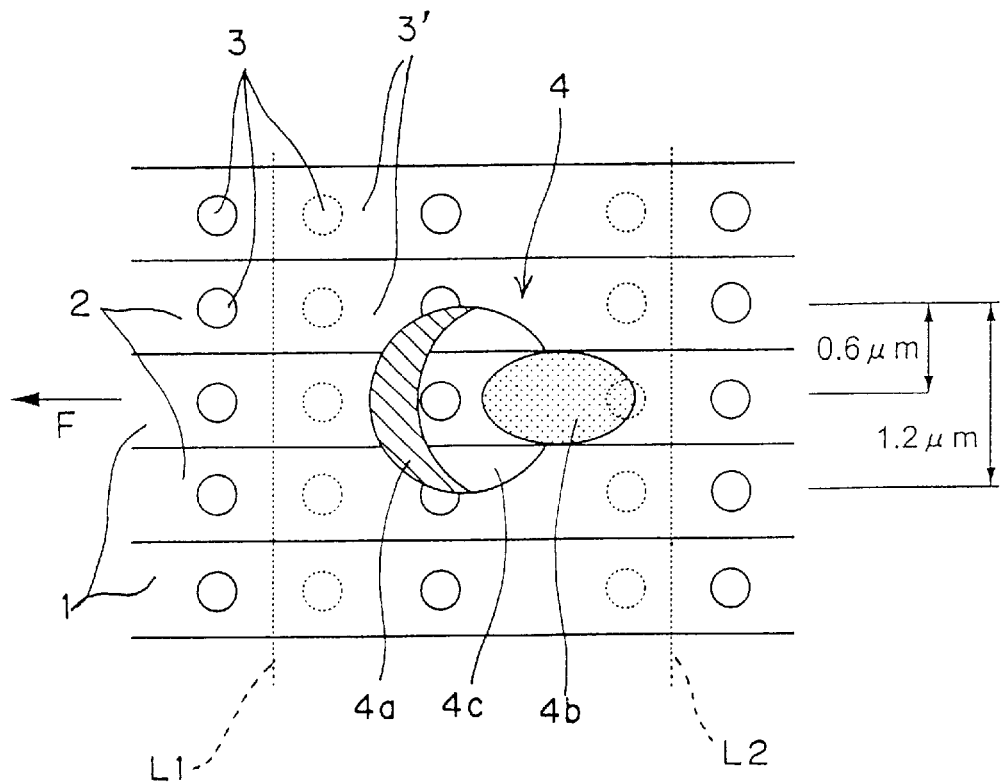
FIG. 2 is a diagram showing that the information recorded by land and groove recording is read.
Figure 3:
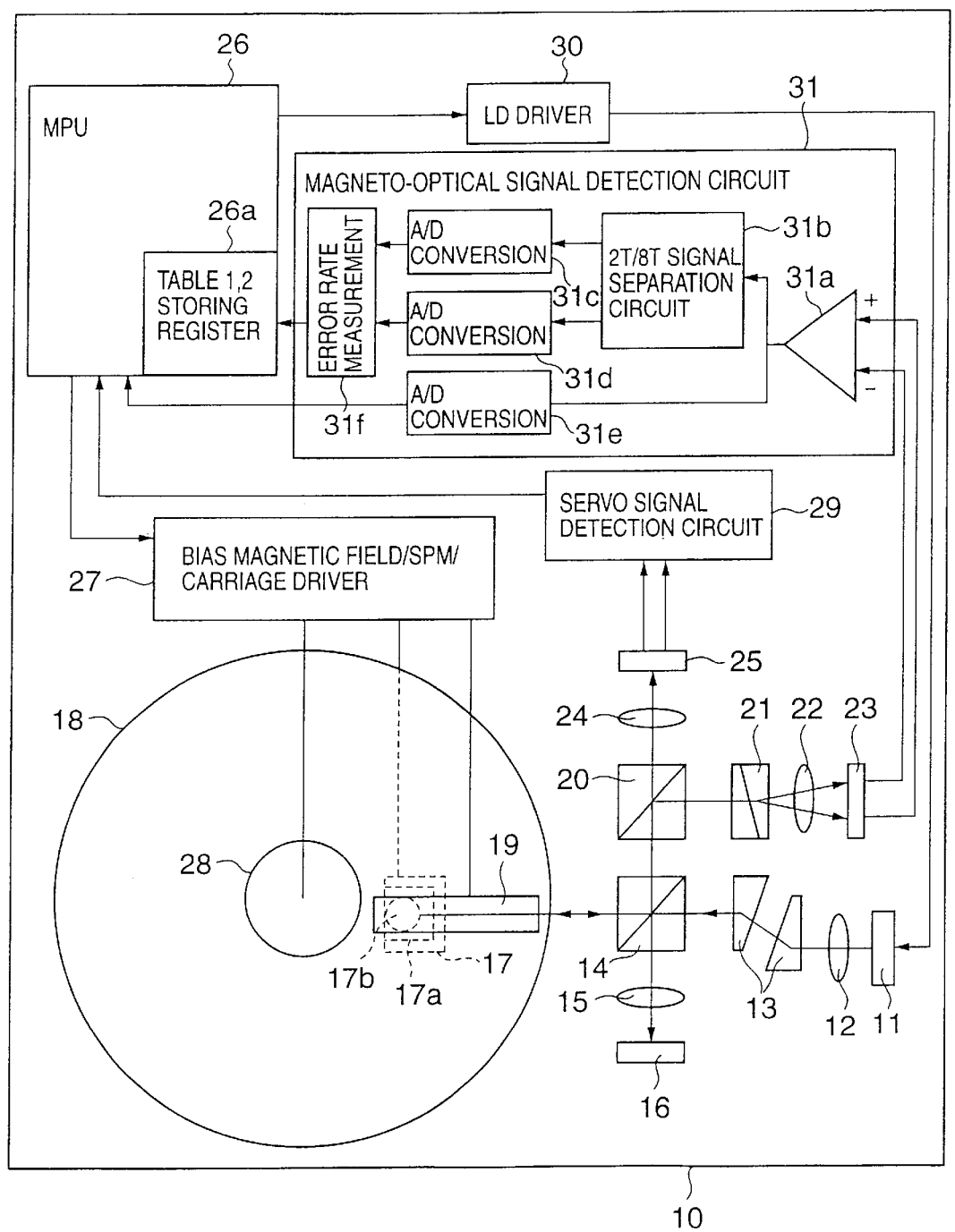
FIG. 3 is a diagram showing one embodiment of a magneto-optical information reproducing apparatus of the present invention.

FIG. 3 is a diagram showing one embodiment of the magneto-optical information reproducing apparatus of the present invention.

A laser diode 11 of a magneto-optical information reproducing apparatus 10 emits a laser light as a diffusion flux with an elliptical section, and the laser light emanated from the laser diode 11 is passed through a collimating lens 12 for converting the diffusion flux to a parallel flux and a rounding correction prisms 13 for rounding/correction a laser flux sectional shape, and is incident upon a polarized beam splitter 14 A reflected light by the polarized beam splitter 14 is converged by a lens 15 and received by an emanated light monitoring light receiving element 16. An output signal of the emanated light monitoring light receiving element 16 is fed back to the laser diode 11, but the description thereof is omitted.

Moreover, a transmitted light of the polarized beam splitter 14 is guided to an irradiation position on a magneto-optical disk (MO disk) 18 provided with an MSR film (a recording film including a recording layer, intermediate layer, and reproducing layer) by a carriage 17 with a rising mirror 17a and an objective lens 17b mounted thereon, and converged to the surface of the MO disk 18.

For an area in which no information is recorded on the MO disk 18, the entire area is in a clear state. Moreover, during writing of the recording mark, a pulse-like laser light in accordance with the information to be recorded in the MO disk 18 is radiated to the MO disk 18, the radiated laser light heats a recording film (recording film whose magnetization is in the clear state) of the MO disk 18 to a predetermined temperature or more, and a static recording magnetic field is applied to the MO disk 18 by a biasing electromagnet 19. As a result, the recording mark (a part whose magnetization state is a recording state) is formed on the recording film of the MO disk 18.

During reading of the recording mark, a continuous light is radiated to the MO disk 18 to such an extent that the recording mark is not overheated, and the biasing electromagnet 19 applies a static reproducing magnetic field in the same magnetic field direction as the magnetic field direction during writing. Therefore, the biasing electromagnet 19 is one example of a magnetic field generating section mentioned in the present invention. As a result of radiation of the continuous light and application of the reproducing magnetic field, the aforementioned front and rear masks are formed and a reading range of the recording mark is limited. The laser light radiated to the MO disk 18 changes its polarization direction to a direction in accordance with the magnetization state of the recording film, and returns to the polarized beam splitter 14 with a mixed state of P and S polarized components. For the light returned to the polarized beam splitter 14, about 15% of P polarized components and 100% of S polarized components are reflected by the polarized beam splitter 14, and a light quantity is divided to a reflected light and a transmitted light by a beam splitter 20.

The reflected light by the beam splitter 20 is split to a normal light and an abnormal light by a Wollaston prism 21, converged by a lens 22 and received by a magneto-optical signal detecting light receiving element 23. Moreover, the transmitted light from the beam splitter 20 is converged by a lens 24 and received by a servo signal detecting light receiving element 25.

Figure 4:
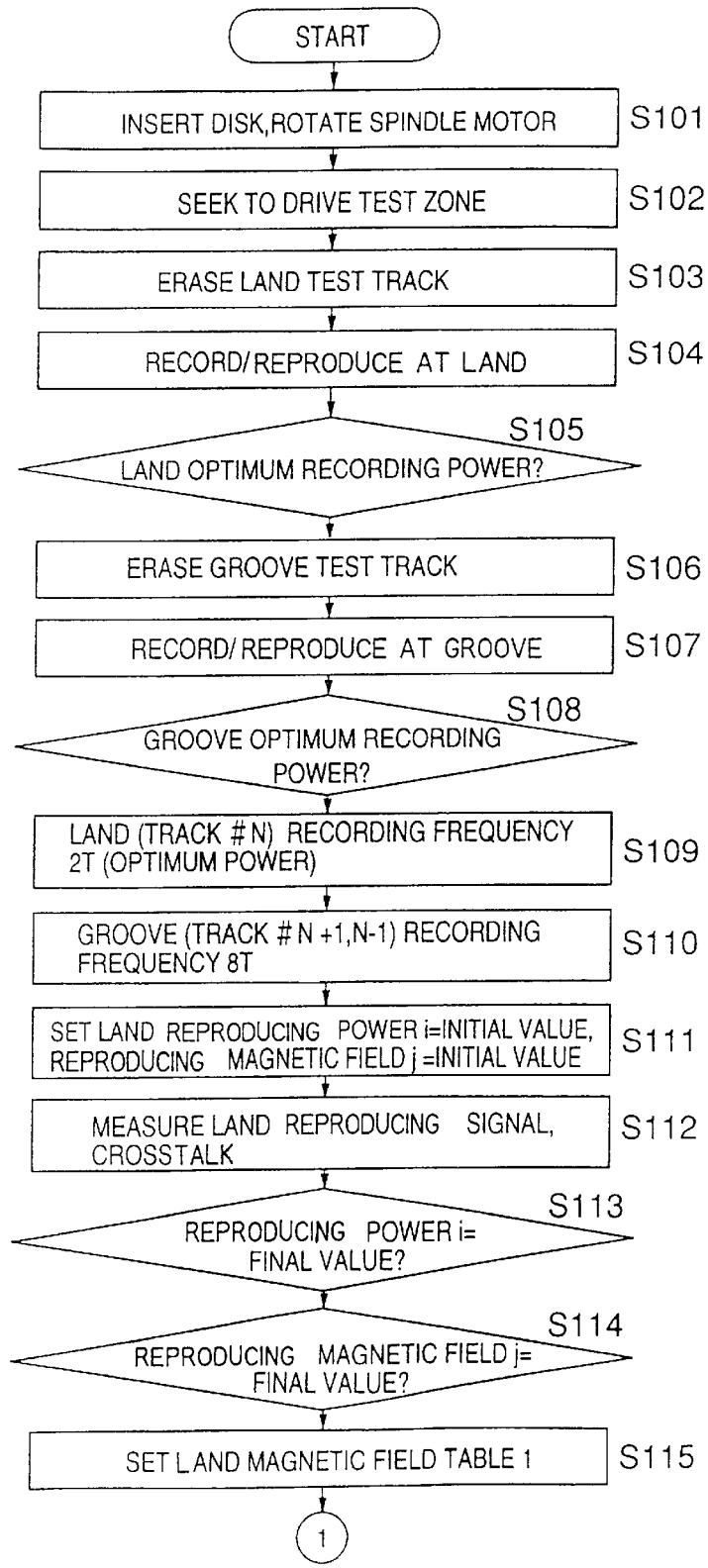
FIG. 4 shows a first part of a flowchart showing an operation of the magneto-optical information reproducing apparatus.
Figure 5:
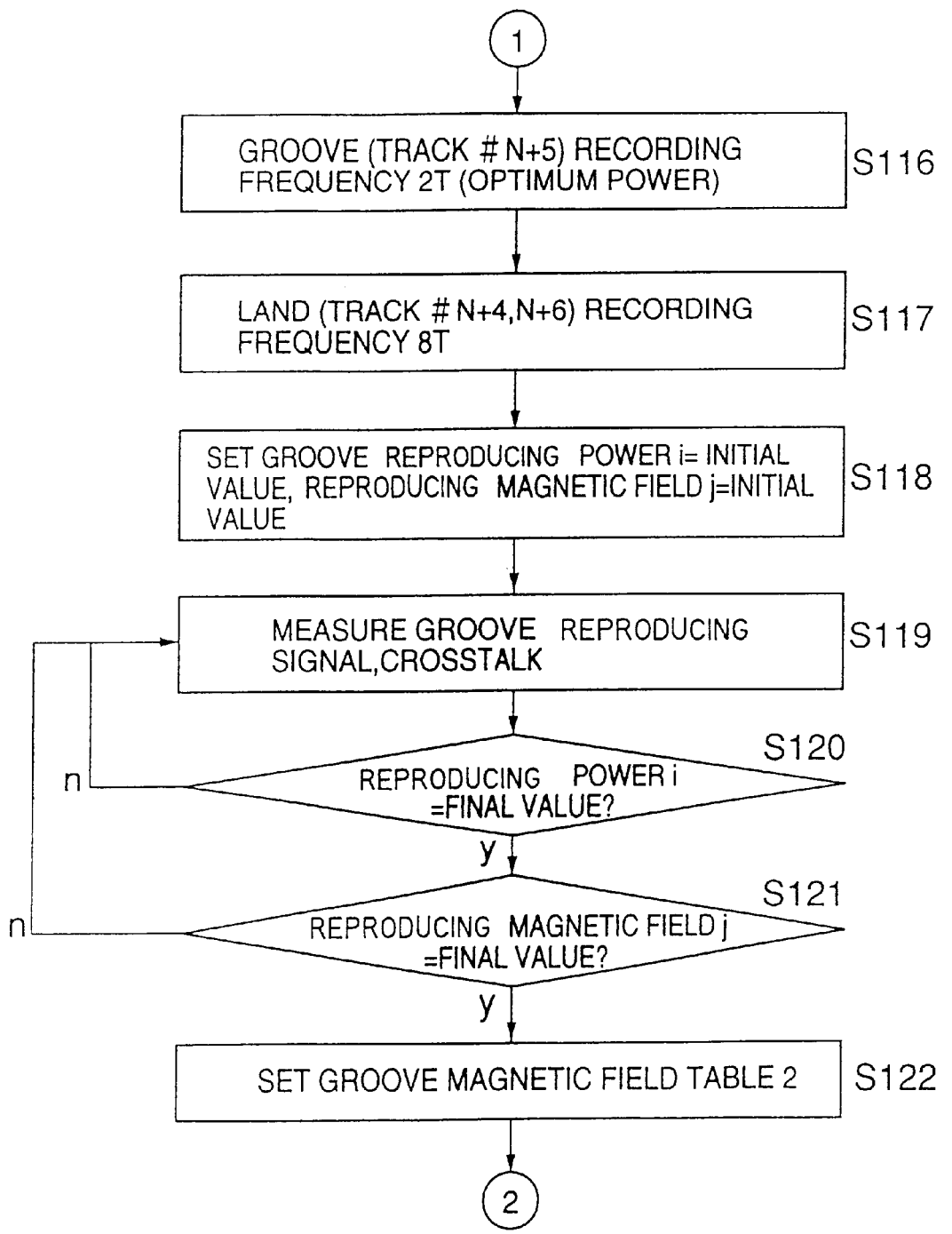
FIG. 5 shows a second part of the flowchart showing the operation of the magneto-optical information reproducing apparatus.
Figure 6:
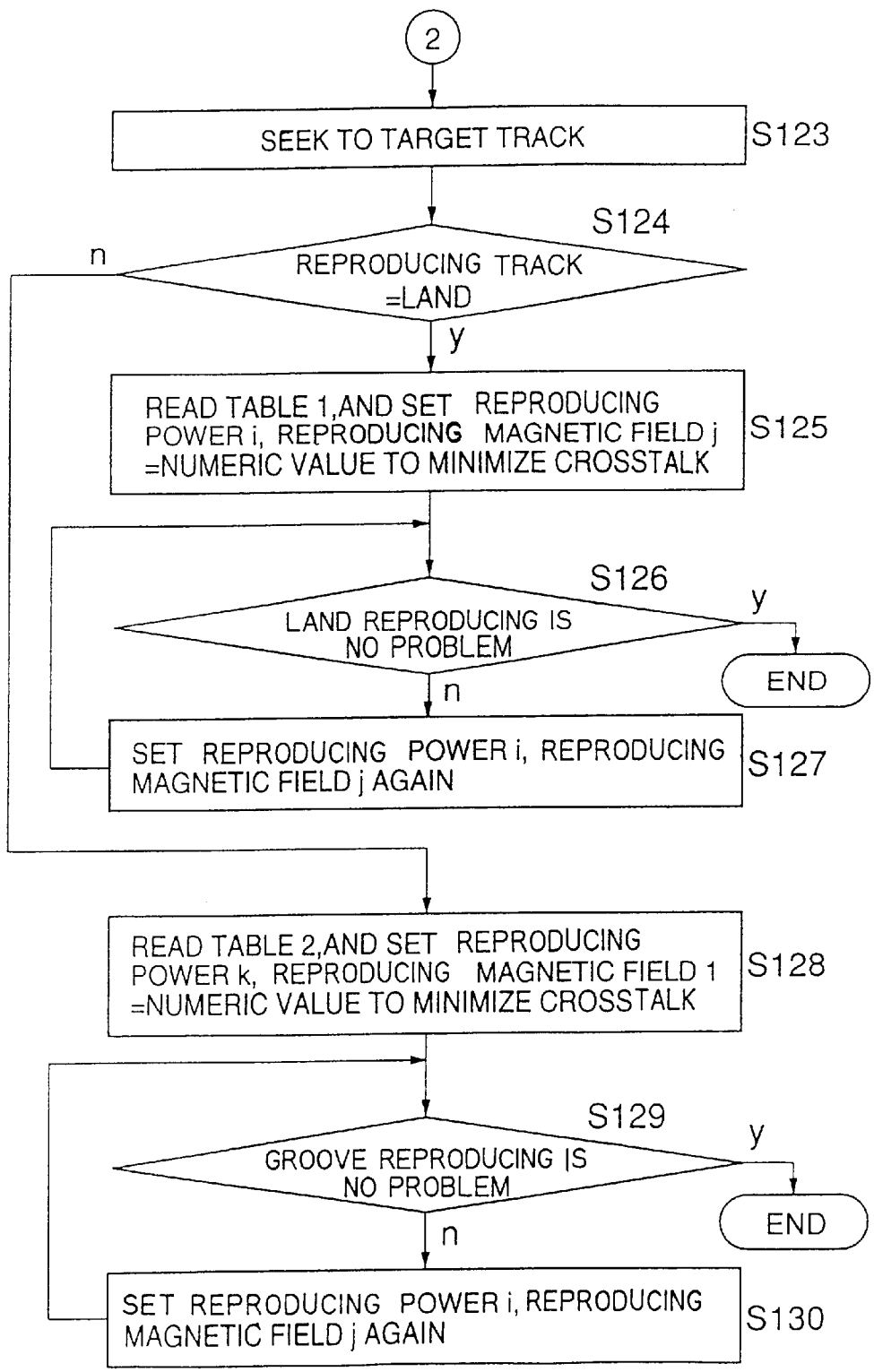
FIG. 6 shows a third part of the flowchart showing the operation of the magneto-optical information reproducing apparatus.

FIGS. 4, 5, and 6 are flowcharts showing an operation of the magneto-optical information reproducing apparatus 10 shown in FIG. 3.

The operation of the magneto-optical information reproducing apparatus 10 will be described hereinafter with reference to FIG. 3 and the flowcharts.

First, when the MO disk 18 is inserted into the magneto-optical information reproducing apparatus 10, a microprocessor unit (MPU) 26 detects the insertion of the MO disk 18 via a detection mechanism (not shown), the MPU 26 transmits an instruction to a driver 27, the driver 27 controls a spindle motor 28, and the spindle motor 28 rotates the MO disk 18 (step S101). Subsequently, a tracking servo signal and focus servo signal are detected from an output of the servo signal detecting light receiving element 25 shown in FIG. 3 by a servo signal detection circuit 29 and inputted to the MPU 26. Subsequently, when the MPU 26 gives the instruction to the driver 27 based on the tracking servo signal and focus servo signal, the driver 27 controls the carriage 17, and as a result the carriage 17 seeks to a drive test zone (step S102).

Thereafter, as described later in detail, test recording is performed to the land and groove and an optimum power of the irradiation light during recording is obtained (steps S103 to S108).

First, when the MPU 26 shown in FIG. 3 gives instructions to the driver 27 and laser diode driver 30, the driver 27 and laser diode driver 30 control the biasing electromagnet 19 and laser diode 11, the recording mark on a test track of the land is erased (cleared), and the entire test track is placed in the clear state (step S103). Subsequently, when the MPU 26 gives an instruction to the laser diode driver 30, the laser diode driver 30 controls the laser diode 11, and the laser diode 11 emits a laser light with a predetermined power so that a test recording of the recording mark is performed. In this case, the recording mark subjected to the test recording is recorded with a period signal of a so-called 2T pattern.

Subsequently, the recorded recording mark is irradiated with a reproducing irradiation light, the magneto-optical signal detecting light receiving element 23 shown in FIG. 3 receives the normal light and abnormal light, outputs in response to the normal and abnormal lights are inputted to a magneto-optical signal detection circuit 31, and a magneto-optical signal is detected as an analog reproducing signal by a differential circuit 31a (step S104). Moreover, during reproducing of test recording mark, an output of the differential circuit 31a is inputted to a 2T/8T signal separation circuit 31b, and the 2T pattern period signal outputted from the 2T/8T signal separation circuit 31b is inputted to an A/D conversion circuit 31c for the 2T pattern and is A/D converted. During reproducing of the test recording mark, an A/D conversion circuit 31d for the 8T pattern and an A/D conversion circuit 31e for usual reproducing are not used. A digital signal outputted from the A/D conversion circuit 31c for the 2T pattern is inputted to an error rate measurement circuit 31f, a digital signal error rate is measured, and a measurement result is inputted to the MPU 26. Subsequently, the MPU 26 judges based on the error rate measurement result whether or not an irradiation light power is an optimum recording power (step S105). When it is judged that the power is not optimum, the land test track is erased again (step S103), by the instruction given to the laser diode driver 30 by the MPU 26 shown in FIG. 3 the irradiation light power is changed to perform the test recording and reproducing again (step S104), and it is again judged whether or not the recording power is optimum (step S105). When the erasing, test recording, reproducing, and judgment are repeated in this manner to reach the optimum recording power (step S105: y), the recording power is stored in the MPU 26 shown in FIG. 3.

Thereafter, in a procedure similar to that of the aforementioned steps S103 to S105, the test recording or the like is performed on the test track of the groove (steps S106 to S108), the irradiation light power reaches an optimum recording power (step S108: y) and the recording power is then stored in the MPU 26.

Subsequently, as described hereinafter in detail, with respect to the land and groove, by measuring the crosstalk level by a plurality of reproducing magnetic field intensities and a plurality of irradiation light powers, a table indicating a relation among the reproducing magnetic field intensity, irradiation light power and crosstalk level is prepared (steps S109 to S122). Specifically, an operation as a relation data preparing section mentioned in the present invention is executed.

First, when the MPU 26 shown in FIG. 3 gives instructions to the driver 27 and laser diode driver 30, the recording mark by the period signal of the 2T pattern is recorded in the land with track number "N" by the irradiation light of an optimum recording power (step S109). Moreover, the recording mark by the period signal of the 8T pattern is recorded both in the groove with track number "N+1" and the groove with track number "N−1" which are adjacent to an "N"-th track by the irradiation light of the optimum recording power (step S110).

FIG. 7 shows the recording marks by the period signals of the 2T and 8T patterns recorded in the land and groove.

FIG. 7 representatively shows a groove 181 with track number "N−1", a land 182 with track number "N", and a groove 183 with track number "N+1". A recording mark 184 of the 2T pattern is formed on the land 182, and a recording mark 185 of the 8T pattern is formed both in grooves 181, 183 both adjacent to the land 182. Moreover, when the reproducing is performed by tracking an irradiation light spot 186 on the land 182, the magneto-optical signal is obtained in which the period signal of the 2T pattern as an original reproducing signal component and the period signal of the 8T pattern as a crosstalk component are mixed.

In the aforementioned steps S109 and S110, when the recording marks by the period signals of the 2T and 8T patterns are recorded in the land and groove, an initial value of the reproducing magnetic field intensity and an initial value of the irradiation light power for land tracking are indicated to the driver 27 and laser diode driver 30 from the MPU 26 shown in FIG. 3, and the intensity of the reproducing magnetic field by the biasing electromagnet 19 and the intensity of the irradiation light by the laser diode 11 are controlled by the driver 27 and laser diode driver 30 (step S111). Subsequently, by applying the reproducing magnetic field and radiating the reproducing irradiation light to the recording mark, receiving the normal light and abnormal light by the magneto-optical signal detecting light receiving element 23 shown in FIG. 3 similarly as described above, and inputting the outputs in response to the normal and abnormal lights to the magneto-optical signal detection circuit 31, the magneto-optical signal is detected as the analog signal by the differential circuit 31a. Thereafter, the magneto-optical signal detection circuit 31 performs the detection of the reproducing signal and measurement of the crosstalk level (step S112).

FIG. 8 is an explanatory view of reproducing signal detection and crosstalk level measurement in the magneto-optical signal detection circuit 31.

The magneto-optical signal detected by the difference circuit 31a is inputted to the 2T/8T signal separation circuit 31b. The 2T/8T signal separation circuit 31b is constituted of a low pass filter 31g and a high pass filter 31h whose cutoff frequencies are both 10 MHz, and the magneto-optical signal is inputted both to the low pass filter 31g and high pass filter 31h. Here, as one example, shown is the low pass filter 31g or the high pass filter 31h which is formed of a secondary active filter.

As described above, the magneto-optical signal is a signal in which the period signal of the 2T pattern as the original reproducing signal component is mixed with the period signal of the 8T pattern as the crosstalk component, the low pass filter 31g passes only period signal S1 of the 8T pattern among the magneto-optical signals, and the high pass filter 31h passes only period signal S2 of the 2T pattern among the magneto-optical signals. Subsequently, the period signal S1 of the 8T pattern passed through the low pass filter 31g is converted to a digital signal S3 constituted of a binary data string by the A/D conversion circuit 31c for the 8T pattern and inputted to the error rate measurement circuit 31f. On the other hand, the period signal S2 of the 2T pattern passed through the high pass filter 31h is similarly converted to a digital signal S4 constituted of the binary data string by the A/D conversion circuit 31d for the 2T pattern and inputted to the error rate measurement circuit 31f.

Additionally, a quality of the analog signal can be evaluated by a signal intensity, but the digital signal has a constant signal intensity, and it is therefore impossible to evaluate the signal quality by the signal intensity. However, the binary data strings outputted from the respective A/D conversion circuits 31c, 31d correctly reproduce the 2T and 8T patterns when the period signal intensity increases, and incorrectly reproduce the 2T and 8T patterns when the period signal intensity decreases. Therefore, when the reproducibility of the 2T pattern or the 8T pattern is noticed, the quality of the digital signal can be evaluated.

Here, the error rate measurement circuit 31f measures a ratio of data deviating from the 2T pattern or the 8T pattern among the binary data constituting the binary data strings outputted from the respective A/D conversion circuits 31c, 31d. This ratio is generally referred to as the error rate, and the quality of the reproducing signal or the crosstalk level is evaluated based on the error rate. When the error rate of the digital signal S4 obtained by converting the 2T pattern period signal S2 as the original reproducing signal component decreases, the quality of the reproducing signal is raised. When the error rate of the digital signal S3 obtained by converting the 8T pattern period signal S1 as the crosstalk component from the adjacent track increases, the crosstalk level is lowered.

The error rate measured by the error rate measurement circuit 31f is inputted to the MPU 26 shown in FIG. 3.

The aforementioned error rate measurement of the reproducing signal and the crosstalk error rate measurement in the magneto-optical signal detection circuit 31 (step S112) are repeatedly executed by changing the reproducing magnetic field intensity and irradiation light intensity little by little, until the reproducing magnetic field intensity and irradiation light intensity reach respective final values (steps S113, S114). As a result, in the MPU 26, Table 1 is prepared which indicates a relation among the reproducing magnetic field intensity, irradiation light intensity and crosstalk level during land tracking, and the Table 1 is stored in a table storing register 26a in the MPU 26 (step S115). This Table 1 is one example of relation data mentioned in the present invention, and the MPU 26, biasing electromagnet 19, magneto-optical detection circuit 31, and the like cooperate with one another to operate as a relation data preparing section mentioned in the present invention.

Similarly as described above, the recording mark by the period signal of the 2T pattern is recorded in the groove with track number "N+5" (step S116), the recording mark by the period signal of the 8T pattern is recorded both in the land with track number "N+6" and the land with track number "N+4" which are adjacent to "N+5"-th track (step S117), the measurements of the reproducing signal error rate and crosstalk error rate are repeatedly executed by changing the reproducing magnetic field intensity and irradiation light intensity little by little (steps S118 to S121), and Table 2 indicating a relation among the reproducing magnetic field intensity, irradiation light intensity and crosstalk level during groove tracking is stored in the table storing register 26a (step S122). This Table 2 is also one example of the relation data mentioned in the present invention.

FIGS. 9 to 12 are graphs showing one example of measurement results in the aforementioned steps S112 and S118. These graphs will be described hereinafter.

FIG. 9 is a graph showing one example of a crosstalk measurement result during land tracking.

The graph ordinate indicates a ratio of a carrier to a noise with respect to the period signal of the 8T pattern corresponding to the crosstalk, and this ratio is converted from the error rate. The graph abscissa indicates the irradiation light intensity. Moreover, a curve 41 with circles attached thereto shows a measurement result when the reproducing magnetic field intensity is 23874 A/m (300 Oe), a curve 42 with triangles attached thereto shows a measurement result when the reproducing magnetic field intensity is 27853 A/m (350 Oe), a curve 43 with crosses attached thereto shows a measurement result when the reproducing magnetic field intensity is 31832 A/m (400 Oe), and a curve 44 with squares attached thereto shows a measurement result when the reproducing magnetic field intensity is 35811 A/m (450 Oe).

The respective curves 41, 42, 43, 44 are all curves descending to the right, and indicate that when the irradiation light intensity increases, the level of the crosstalk attributed to the recording mark on the groove is lowered. Moreover, the relation among the respective curves 41, 42, 43, 44 indicates that when the reproducing magnetic field intensity increases, the level of the crosstalk attributed to the recording mark on the groove is lowered.

FIG. 10 is a graph showing one example of the crosstalk measurement result during groove tracking.

Similarly as the graph of FIG. 9, the graph ordinate of FIG. 10 indicates the ratio of the carrier to the noise with respect to the period signal of the 8T pattern corresponding to the crosstalk, and the abscissa indicates the irradiation light intensity. Moreover, respective curves 45, 46, 47, 48 to which the circles, triangles, crosses, squares are attached show measurement results when the reproducing magnetic field intensities are 23874 A/m (300 Oe), 27853 A/m (350 Oe), 31832 A/m (400 Oe), 35811 A/m (450 Oe), respectively.

In the graph of FIG. 10 the respective curves 45, 46, 47, 48 are all curves ascending to the right, and indicate that when the irradiation light intensity decreases, the level of the crosstalk attributed to the recording mark on the land is lowered. Moreover, the relation among the respective curves 45, 46, 47, 48 indicates that when the reproducing magnetic field intensity decreases, the level of the crosstalk attributed to the recording mark on the land is lowered.

FIG. 11 is a graph showing one example of a detection result of the reproducing signal during the land tracking.

The graph ordinate of FIG. 11 indicates the ratio of the carrier to the noise with respect to the period signal corresponding to the reproducing signal, and the abscissa indicates the irradiation light intensity. Additionally, a graph ordinate scale of FIG. 11 is an enlarged scale as compared with graph ordinate scales of FIGS. 9 and 10. Moreover, here, for the convenience of measurement, the recording mark by the 8T pattern period signal is recorded on the land and measured, but the carrier noise ratio in the recording of the recording mark by the 2T pattern period signal is only smaller in absolute value than the carrier noise ratio shown in FIG. 11, and dependence of the carrier noise ratio on the reproducing magnetic field intensity or the irradiation light intensity is entirely similar.

Moreover, since meanings of respective curves 49, 50, 51, 52 to which the circles, triangles, crosses, squares are attached are similar to those of FIGS. 9 and 10, the description thereof is omitted.

Changes of the reproducing signal intensities indicated by the respective curves 49, 50, 51, 52 of the graph of FIG. 11 are small changes of about 1/10 of changes of the crosstalk levels shown by the respective curves 41, 42, 43, 44 of the graph of FIG. 9, and it is thought that the reproducing signal intensity does not depend on the reproducing magnetic field intensity and irradiation light intensity.

FIG. 12 is a graph showing one example of the detection result of the reproducing signal during the groove tracking.

Similarly as the graph of FIG. 11, the graph ordinate of FIG. 12 indicates the ratio of the carrier to the noise with respect to the period signal corresponding to the reproducing signal, and the abscissa indicates the irradiation light intensity. Moreover, the graph ordinate scale of FIG. 12 is an enlarged scale as compared with the graph ordinate scales of FIGS. 9 and 10. Here, also for the convenience of measurement, the recording mark by the 8T pattern period signal is used.

Moreover, since the meanings of respective curves 53, 54, 55, 56 to which the circles, triangles, crosses, squares are attached are similar to those of FIGS. 9 and 10, the description thereof is omitted.

Furthermore, the changes of the reproducing signal intensities indicated by the respective curves 53, 54, 55, 56 of the graph of FIG. 12 are small changes of about 1/20 of the changes of the crosstalk levels shown by the respective curves 45, 46, 47, 48 of the graph of FIG. 10, and it is also thought here that the reproducing signal intensity does not depend on the reproducing magnetic field intensity and irradiation light intensity.

Table 1, Table 2 showing the measurement results with respect to the land and groove are prepared, and stored in the table storing register 26a in the MPU 26, and subsequently, as described below in detail, actual information reproducing is performed based on these Table 1, Table 2 (steps S123 to S130).

First, the carriage 17 shown in FIG. 3 is sought to the target track (step S123), and it is judged whether the target track is a land or not (step S124). When it is judged that the target track is the land, the table for the land Table 1 is read from the table storing register 26a in the MPU 26, and the MPU 26 sets respective values of the irradiation light intensity and reproducing magnetic field intensity based on Table 1 so that the crosstalk level is minimized (step S125). Therefore, the MPU 26 is one example of an adjusting section mentioned in the present invention.

Subsequently, the reproducing of information recorded in the land is performed. During the information reproducing, an output from the magneto-optical signal detecting light receiving element 23 is inputted to the differential circuit 31a of the magneto-optical signal detection circuit 31, and an output of the differential circuit 31a is inputted to the A/D conversion circuit 31e during usual reproducing so that the reproducing signal is detected. Subsequently, the reproducing signal outputted from the A/D conversion circuit 31e during the usual reproducing is inputted to the MPU 26. When there is no problem in the reproducing (step S126: y), the information reproducing is ended and reproducing information is outputted to the outside of the magneto-optical information reproducing apparatus 10. When there is a problem in the reproducing (step S126: n), the irradiation light intensity is slightly raised, the reproducing magnetic field intensity is set based on Table 1 to minimize the crosstalk (step S127), and the information reproducing is performed anew.

In the aforementioned step S124, when it is judged that the target track is the groove, similarly as during the land tracking, the table for the groove Table 2 is read, the respective values of the irradiation light intensity and reproducing magnetic field intensity are set based on Table 2 to minimize the crosstalk level (step S128), the information recorded in the groove is reproduced, there is no problem in the reproducing (step S129: y) and the information reproducing is then ended. When there is a problem in the reproducing (step S129: n), the irradiation light intensity is slightly raised, the reproducing magnetic field intensity is set based on Table 2 to minimize the crosstalk (step S130), and the information reproducing is performed anew.

As described above, since the values of the irradiation light intensity and reproducing magnetic field intensity in the land and groove are set based on the respective tables Table 1, Table 2, the crosstalk level is depressed to a low level.

Additionally, in the present embodiment, the reproducing magnetic field intensity, and the like are set so that the crosstalk level is minimized, but in the magneto-optical information reproducing apparatus of the present invention, in a range in which the crosstalk level is a predetermined level or less, the reproducing magnetic field intensity may be set to minimum. This setting is effective for realizing power saving.

As described above, according to the magneto-optical information reproducing apparatus of the present invention, the information reproducing can be performed at a low crosstalk level. Moreover, the magneto-optical information reproducing apparatus can be realized which records the information both in the land and the groove and which is high in information recording density.

What is claimed is:

1. A magneto-optical information reproducing apparatus for reproducing information recorded in a recording medium in which a groove and a land are alternately disposed and the information is recorded both in the groove and the land, and for reproducing the information by applying a magnetic field to the recording medium and irradiating the recording medium with a light, said magneto-optical information reproducing apparatus comprising:

a magnetic field generating section for generating said magnetic field; and an adjusting section for adjusting an intensity of the magnetic field generated by said magnetic field generating section with respect to the land and the groove so that with respect to one of the land and the groove in which reproducing object information is recorded, a level of a crosstalk attributed to the information recorded in the other one of the land and the groove is lowered.

2. The magneto-optical information reproducing apparatus according to claim 1 wherein said adjusting section adjusts the intensity of said magnetic field in accordance with an intensity of the light radiated to said recording medium so that the level of said crosstalk is lowered.

3. The magneto-optical information reproducing apparatus according to claim 1 further comprising a relation data preparing section for reproducing predetermined information with a plurality of magnetic field intensities and a plurality of irradiation light quantities and measuring the level of said crosstalk to prepare relation data indicating a relation among the magnetic field intensity, the irradiation light quantity and the crosstalk level based on a measurement result, wherein said adjusting section adjusts the intensity of said magnetic field based on the relation data prepared by said relation data preparing section.

4. The magneto-optical information reproducing apparatus according to claim 3 wherein said relation data preparing section records a period signal for the land and a period signal for the groove different in frequency from each other in the land and the groove of said recording medium, regenerates the recorded period signals with the plurality of magnetic field intensities and the plurality of irradiation light quantities and measures the level of said crosstalk to prepare said relation data based on the measurement result.

5. The magneto-optical information reproducing apparatus according to claim 1 wherein said recording medium is a recording medium of the magnetically induced super resolution type.

6. A magneto-optical information reproducing apparatus for reproducing information recorded in a recording medium in which a groove and a land are alternately disposed and the information is recorded both in the groove and the land, and for reproducing the information by applying a magnetic field to the recording medium and irradiating the recording medium with a light, said magneto-optical information reproducing apparatus comprising:

an object lens for irradiating the recording medium with the light;

a carriage mounted said object lens, for carrying the object lens to desired position; and a magnetic field generating section for generating said magnetic field when reproduce the information, intensity of said magnetic field is adjusted so that with respect to one of the land and the groove in which reproducing object information is recorded, a level of a crosstalk attributed to the information recorded in the other one of the land and the groove is lowered.

7. The magneto-optical information reproducing apparatus according to claim 6 wherein said recording medium is a recording medium of the magnetically induced super resolution type.

8. A magneto-optical information reproducing method for reproducing information recorded in a recording medium in which a groove and a land are alternately disposed and the information is recorded both in the groove and the land, and for reproducing the information by applying a magnetic field to the recording medium and irradiating the recording medium with a light, said magneto-optical information reproducing method comprising:

a light irradiating step wherein the recording medium is irradiated with a light;

an adjusting step wherein intensities of the respective magnetic fields for the land and the groove are adjusted so that with respect to one of the land and the groove in which reproducing object information is recorded, a level of a crosstalk attributed to the information recorded in the other one of the land and the groove is lowered; and a magnetic field generating step wherein said magnetic field is applied to the recording medium.

9. The magneto-optical information reproducing method according to claim 8 wherein, at said adjusting step, the intensity of said magnetic field is adjusted in accordance with an intensity of the light radiated to said recording medium so that the level of said crosstalk is lowered.

10. The magneto-optical information reproducing method according to claim 8 further comprising a relation data preparing step wherein a predetermined information is reproduced with a plurality of magnetic field intensities and a plurality of irradiation light quantities and the level of said crosstalk is measured to prepare relation data indicating a relation among the magnetic field intensity, the irradiation light quantity and the crosstalk level based on a measurement result, wherein at said adjusting step, the intensity of said magnetic field is adjusted on the relation data prepared by said relation data preparing section.

* * * * *